United States Patent [19]

Vandling, III

[11] Patent Number: 5,339,404

[45] Date of Patent: Aug. 16, 1994

[54] ASYNCHRONOUS TMR PROCESSING SYSTEM

[75] Inventor: Gilbert C. Vandling, III, Endicott, N.Y.

[73] Assignee: International Business Machines Corporation, New York, N.Y.

[21] Appl. No.: 706,497

[22] Filed: May 28, 1991

[51] Int. Cl.$^5$ .............................................. G06F 11/08
[52] U.S. Cl. ...................................... 395/575; 371/36; 371/68.1
[58] Field of Search .................... 371/36, 68.1, 68.2, 371/68.3, 9.1; 364/269, 269.1; 395/575

[56] References Cited

U.S. PATENT DOCUMENTS

| | | | |
|---|---|---|---|
| 3,921,149 | 11/1975 | Kreis | 340/172.5 |
| 4,363,096 | 12/1982 | Comfort | 364/200 |
| 4,644,498 | 2/1987 | Bedard | 371/36 X |
| 4,667,284 | 5/1987 | Asami | 364/187 |
| 4,868,826 | 9/1989 | Smith et al. | 371/9.1 |
| 4,882,731 | 11/1989 | van Gils | 371/37.6 |
| 4,907,232 | 10/1990 | Harper et al. | 371/36 |
| 4,916,695 | 4/1990 | Ossfeldt | 371/9.1 |
| 4,965,717 | 10/1990 | Cutts | 364/200 |
| 5,038,276 | 8/1991 | Bozzetti | 364/200 |
| 5,117,442 | 5/1992 | Hall | 370/103 |
| 5,193,175 | 3/1993 | Cutts | 395/575 |
| 5,226,152 | 7/1993 | Klug | 395/575 |

Primary Examiner—Robert W. Beausoliel, Jr.
Assistant Examiner—Glenn Snyder
Attorney, Agent, or Firm—Lynn L. Augspurger; William H. Steinberg; Eugene I. Shkurko

[57] ABSTRACT

A triple modular redundancy computing system including three asynchronously connected processing elements, each having its own memory, a plurality of arbiters cross connecting processor elements for enforcing synchronization for tasks and for voting arbitration on output and without voting for inputs.

7 Claims, 1 Drawing Sheet

ASYNCHRONOUS TMR PROCESSING SYSTEM

FIELD OF THE INVENTION

This invention relates to Triple Modular Redundancy (TMR) processing systems and particularly to a processing system for achieving TMR operation where elements are asynchronous or skewed with respect to each other.

BACKGROUND OF THE INVENTION

Triple Modular Redundancy with voting is a well known hardware technique used to mask failures in elements which are fully synchronous with each other. This invention provides means for achieving TMR operation where elements are asynchronous or skewed with respect to each other as is frequently expected to be the case as system clock rates continue to increase.

One current system claimed to incorporate asynchronous TMR is the recently announced Tandem S2 system. Although no detailed technical information is available, the Tandem approach is known to be significantly different from that described here. It uses a dual memory and the voting is upon memory reference.

This only known asynchronous TMR system is the Integrity S2 system recently announced by Tandem. That system is said to use dual global memories and to synchronize AND TO VOTE on all CPU accesses to global memory.

In the patented art, reference may be had to U.S. Pat. No. 4,907,232 to Harper et al. issued Mar. 6, 1990, which includes a plurality of processors and a network element connected to each of the processors. That patent mentions an application co-pending entitled "Synchronization of Fault-Tolerant Parallel Processing Systems, which was incorporated by reference, but not identified. This patent appears to relate to synchronizing the communication operations of the network, but does have a different system for providing voting messages. Other patents noted have been U.S. Pat. No. 4,667,284 which related to a Multiplexing control unit issued May 19, 1987; Fault Tolerant Output Circuits, to Smith et al issued Sep. 19, 1989; and van Gils of Holland issued U.S. Pat. No. 4,882,731 which disclosed the use of four data processing modules with related storage and local memory. Three substantially identical processors for parallel synchronous operations and a form of fault localizing was a subject discussed in U.S. Pat. No. 4,916,695 issued Apr. 10, 1990 to Bengt E. Ossfeldt of Sweden.

Asynchronous operation of TMR elements introduces a great many complexities. Consequently, it may not be desirable where synchronous TMR is feasible. There is, however, reason to believe that situations exist today where the improvements to such systems which will be described will be useful.

SUMMARY OF THE INVENTION

There has been little work in the Asynchronous TMR Processing System area, and we have provided a system which uses three or triplicated memories and does not vote on every CPU access to global memory but votes on memory outputs—that is on CPU fetches but not stores—which greatly simplifies the memory system design. In our system there is no need for providing the TMR with fault tolerant clocking which requires that clocks be phase locked and they require much more extensive redesign of existing elements.

These and other improvements are detailed in the following description. For a better understanding specifically as to the improvements described herein, reference should be had to the drawing, where FIG. 1 shows the preferred embodiment of a TMR with local arbitration.

DETAILED DESCRIPTION OF THE PREFERRED EMBODIMENT OF THE INVENTION

Figure 1:
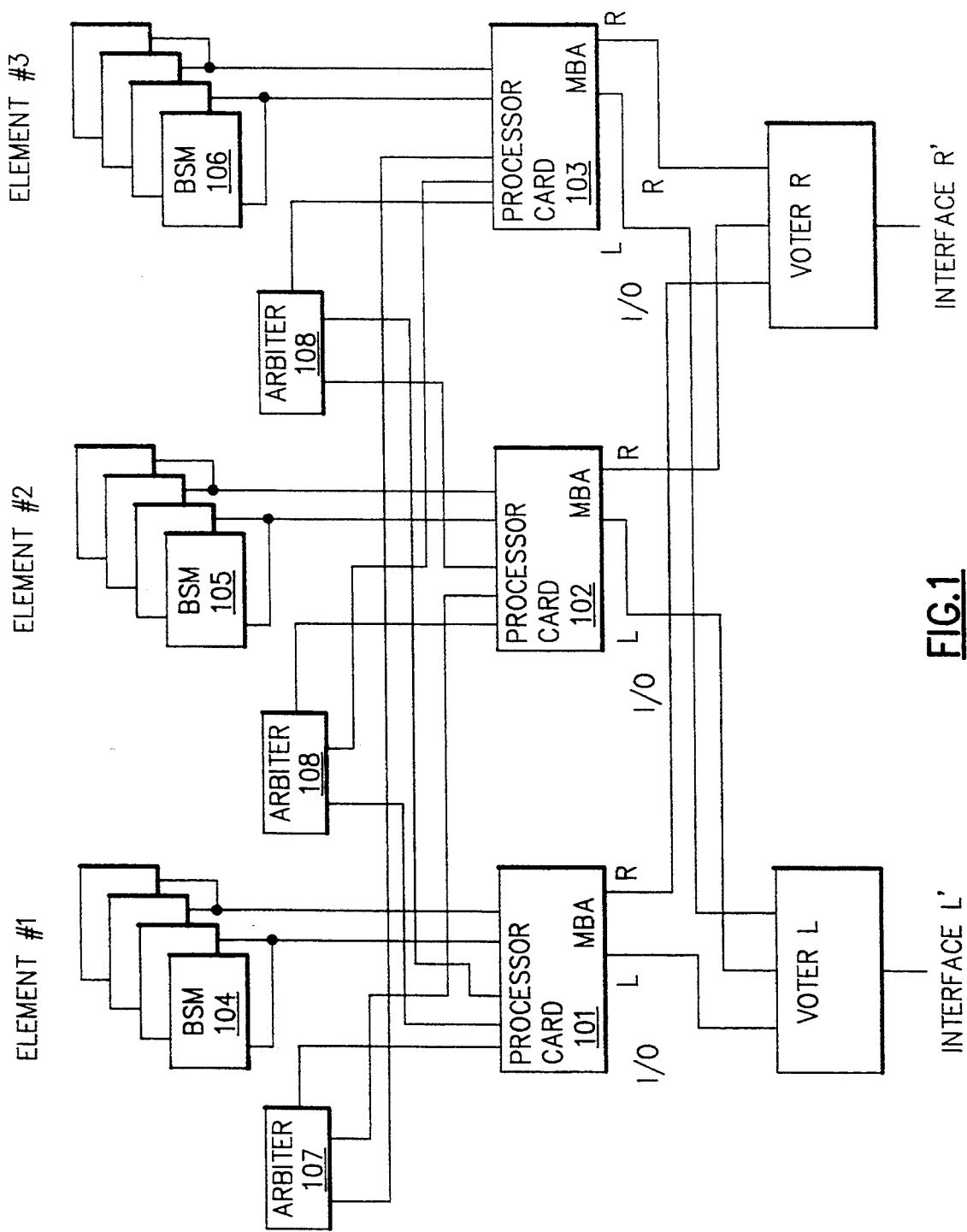

The system shown in the FIGURE one is a Triple Modular Redundancy (TMR) approach. The approach achieves:
  fault masking TMR operation;
  the capability to alternatively operate as three independent elements;
  to permit on-line repair following the failure of any one of the three TMR elements;
  to employ microprocessor elements originally planned without TMR as an objective with little modification;
  not require a common clock;
  to reduce single-point failures to the level of diminishing returns;
  to operate synchronously intra-element and asynchronously inter-element;
  and to interface with a conventional (non-TMR) Input/Output (I/O) where other non-transparent techniques such as dual DASD are used for fault tolerance.

The preferred embodiment shown in FIG. 1 achieves the objectives listed. It is understood that these objectives are negotiable and it is expected that the concept described herein can be adapted accordingly.

For example, the approach described will incorporate triplicated main storage in order to permit a mode of operation whereby the system can function as three independent elements. If this objective were to be dropped, then other alternatives such as paired memory or a fault tolerant memory system should be considered. Even so, the basic elements of this invention can be adapted to such systems.

It is presumed here that the reader has some familiarity with fault masking systems in general and TMR system in particular. For this reason it is important to point out in advance a number of features of this invention that may otherwise cause confusion.

First it is noted that there is no voting on data or addresses in the path between the individual processors and their memory. This is an important consideration for packaging and performance reasons. The complexity of voting on the information on these wide interfaces, together with the resultant delay that would be introduced, is considered undesirable. One benefit of this decision is that there are no single points of failure associated with processor/memory interconnectivity.

The only cross connection between the processors is associated with their processor-to-memory interfaces is via the arbiters whose purpose is to enforce synchronization and not check data integrity, as illustrated by FIG. 1.

All voting is done on outputs at the Input/Output (I/O) interfaces of the three process units indicated as a processor card 101, 102, 103, each having a respective Memory Bus Adaptor (MBA). The consequence of this is that, as a result of system faults or failures, the contents of the three processors memory may disagree at some point in time without any intervening disagreement at the output voter. This could be the result, for example, of an erroneous I/O input to the memory of one of the processors.

This can be regarded as an advantage. Any differences in the contents of corresponding memory locations, as the result of an I/O for example, is not a fault. Instead it is a latent fault which will be detected indirectly whenever it results in an output disagreement. Clearly this may never occur. Two such examples are: an incorrect data word which is never read; or an incorrect instruction following a branch that is never taken during the operating period of interest. This seems obvious: the contents of a location that is never read is a don't care.

No attempt has been made to eliminate single point failures: instead the objective is to reduce them to the level where the marginal cost is not justified by the marginal benefit.

Finally, it should be noted that although elements run in memory synchronism, they do not run in strict lock-step. This is a direct consequence of synchronism upon CPU memory fetch access. Synchronization of memory stores is not required.

An individual element is synchronized with the two corresponding processors in the other groups only when it makes an access to main storage. Thus synchronization is a direct consequence of a cache miss. The means of accomplishing synchronization is that the three processors can see a varying number of wait states associated with any access they make to main storage. That is, a storage reference is not made until after at least two of the three corresponding elements in the three groups request a memory fetch. Depending upon how far the processors are out of synchronization, the earliest processor making a memory request can experience more wait states than the second and the second more than the third. Thus the insertion of wait states deskews the processors at every memory reference.

SYSTEM ELEMENTS

The TMR system configuration preferred is shown in the FIG. 1. Each of the triplicated elements consists of a Processor 101, 102, 103, Memory 104, 105, and an Arbiter 107, 108, 109. For discussion purposes, the Processor and Arbiter are each shown as a single card and the memory system is shown as four cards although the actual number of cards is not a particularly relevant consideration. Each processor card 101, 102, and 103, includes a CPU. The voters L and R compare the outputs of the triplicated elements and incorporate error checking but are not TMR.

The following characteristics of each of the TMR'ed elements are noted:

1. A separate memory system is uniquely associated with each element: there is no shared memory;
2. The separate Arbiter is not physically associated with either the processor or the memory as is shown but could be packaged with either if desired;
3. There is a single bidirectional control bus between each Arbiter and its associated processor;
4. There is a single unidirectional control bus between the Arbiter associated with Processor N and the other two Processors;
5. The Arbiter has no access to storage addresses or data from either the Processor or Memory;
6. Each element has a separate clock with frequency accuracy on the order of 30 parts per million: no common clock is used;
   the three separate clocks are free running and no attempt is made to synchronize clocks, and;
7. The I/O system is not TMR: each separate external interface (two are shown, L' and R') is attached to all three elements via a voter associated with each interface.

NO ELEMENT SINGLE-POINT-OF-FAILURE

It is stipulated that Elements are separately powered such that there is no common single point of power failure.

While it would appear that some kinds of Arbiter failures could be single-point-failures this should not be the case. The only connection between an Arbiter 1 associated with one processor 101 to another processor 102, 103, respectively Processor 2 and Processor 3, is a read-only interface for transmitting control information from Processors 2 and 3 to Arbiter 1, and vice versa. There is no path for transfer of either data or control information from Arbiter 1 to Processors 2 and 3. It is, therefore, stipulated that the circuit design of this unidirectional bus be such that Processor 2 and 3 operation is not affected if the Arbiter 1 fails, is unplugged or plugged, or if there is a short to ground on either of the two buses. The details of this connection could be made by persons skilled in the art, so it has not been needed to be included here.

The interface between an Arbiter and its associated Processor is bidirectional and the failure of Arbiter N, the bus from Processor N to Arbiter N, or of Processor N itself CAN result in the failure of element N but NOT in the failure of the remaining two elements.

ARBITRATION

This section describes a means of arbitration which is consistent with the above discussion.

Consider first what it means to operate a system of three synchronous processors in an asynchronous TMR configuration. Herein this means to operate the CPU in one element in memory access synchronism with the CPU's in the remaining two channels but not operate in lock-step during and/or after every CPU cycle.

The three CPU's comprise a TMR group. If started together running the same program without I/O and without asynchronous time dependencies—such as timers or Time of Day (TOD) clocks—they will execute exactly the same program sequence at slightly different rates depending upon the frequency accuracy of their respective oscillators. Were no additional means employed to synchronize them, the time divergence between any two processors at the end of a minute can be as much as 60 microseconds. (The accuracy of any one oscillator can be plus or minus by as much as 30 parts per million with respect to nominal which corresponds to 30 microseconds per minute: with one oscillator having maximum plus deviation and another minus, the maximum deviation can be as much as 60 microseconds.) This corresponds to 1,000 instructions for a processor having an average instruction execution time of 60 nanoseconds which would be 16.7 Million Instructions Per Second (MIPS).

The essence of this TMR arbitration is to insure that, at the same time the CPU or an MBA in one element is granted access to its memory, the corresponding requestor in the other two channels is granted access to their elements memory at the same time.

As shown in the FIGURE, the arbiter associated with a given element has complete knowledge of which requestor or requestors in its associated element want an access. Likewise the arbitrator with a given element also has complete knowledge of which requestors in the other elements are competing for service from their associated memories.

Since the three elements operate from different clocks and are not in lock-step, this arrival pattern of bus requests at any arbiters is not ordered.

To synchronize CPU memory accesses in the three elements, it follows that CPU memory requests must be granted to the three elements at the same time. Thus when the CPU is granted access in element two, it is necessary to grant the CPUs access in the other two elements at the same time.

It also follows that in order to grant a bus request to a CPU in any element, at least two elements must have outstanding CPU requests. That is, it is NECESSARY to have a majority vote for CPU service at an arbiter in order to grant CPU access to the CPU in that element: i.e., have a majority vote for CPU access.

Since the elements are not operating in lock step, it is certain that not all three (or even two) requests for service for a user—again say the CPU—will be discernible at exactly the same time at any arbiters. (For one thing, each CPU makes its requests with respect to its own clock.)

Presuming no failure, after the first request for service arrives—say an access request for CPU 3—at any arbiter, a second CPU request from a different element can be expected to arrive at the same arbiter followed shortly by the third CPU request from the remaining element.

There is no question about what to do immediately following the arrival of the first CPU request: Nothing! When the second CPU request is discerned at an arbiter there is a majority vote for CPU service. That is, two discernible service requests to the same arbiter for CPU service is necessary to grant CPU access for the associated element, but it is NOT sufficient!

Three service requests for the CPU—one from each element—at an arbiter is the normal case for fault free operation and IS sufficient. Now consider how long to wait for the third request following the second. This time delay, call it T, is a design tolerance question and need not be quantified here. Thus if a third request for the CPU is received within a time T following the arrival of the second request, an arbiter can independently grant CPU access to the CPU in that element. (It can only grant access to its corresponding CPU: its interconnection with the other CPU's is via unidirectional busses.)

If the third CPU does not make a corresponding service request for service within T time following the second request, it is deemed to disagree with the majority and the access granted. No other immediate action need be taken.

Memory access for all requesters is arbitrated in the same way.

ARBITER PACKAGING

Although the arbiter is identified as a separate subassembly as it is shown in the FIGURE, in many cases a better choice will be to package the arbiter with its associated Processor. It is a very simple function and requires only a few pins when compared to the BSM's, Processors, and Voters.

PERFORMANCE

Before continuing this description, it is useful to address some of the realities of this invention. To start, it must be noted that the process of arbitration, as introduced above, has an impact on the performance of each CPU. The response to the first earliest CPU to request service is slowed by: (1) waiting for the request from the second fastest CPU; (2) the time increment T; and (3) by any additional delays associated with the actual arbitration. This slow down, as mentioned before, is introduced via the introduction of wait states in series with memory response time. The effect of this delay is to resynchronize the three CPU's. The performance of each—and consequently overall performance—is, therefore, reduced when compared to the performance that can be achieved when a CPU is run in non-TMR mode.

Since all CPU's are running from separate clocks, their clock frequencies are neither identical nor in phase. Therefore, the CPU's do not operate in exact lock step between memory references although they may be close. The access for the fastest CPU—the one who makes the first access request—will be slowed and synchronized with that of the slowest CPU by virtue of the fact that they are running from different oscillators. Furthermore, overall performance will also be impacted as a result of arbitration delays.

The advantage is that—for this invention—the slowdown is expected to be a secondary and not a first order effect. Slowdown is directly associated with synchronization associated with a main storage memory reference and does not occur on a cycle by cycle or instruction by instruction basis. Since the frequency of main storage memory references is directly related to the cache miss ratio, the performance degradation is likewise proportional to the cache miss ratio. There is no synchronization and hence no degradation associated with a cache hit.

In short, performance reduction is a result of clock accuracy and synchronization delays.

INPUT/OUTPUT OVERVIEW

This section is an overview of the organization of the Input/Output system in relationship to the TMR processing complex described above. The discussion is intended to describe this invention at a high level. Subsequent sections will discuss specific details as required.

Two separate, independent, multiplexed, bidirectional, input output interfaces are shown in the FIGURE.

Here the reader is cautioned not to directly associate these two I/O busses with the two memory busses which interconnect the CPU, the MBA and memory:
- the two I/O busses are independent and must be arbitrated
- the two memory busses are not independent and are used together to access an entire cache line at one time
- the I/O busses need not be as wide as the memory busses As a consequence of this, the MBA must have built-in storage to assemble/disassemble data to/from memory and provide rate buffering.

Given this, it will be obvious that there must be arbitration between the two MBA busses as well as between the MBA busses and the CPU's. It is stipulated that there be two MBA inputs to arbitration: one for the left (L) bus and one for the right (R). Thus the arbitration for the shared element memory for each element encompasses: the CPU plus MBA-L and MBA-R.

VOTERS

There are two separate voters: one for the L I/O bus, and one for the R. See the Voters L and R of FIG. 1.

The Input/Output system is not triplicated. Thus three duplicated output data streams from the processor will be voted upon to provide a single fault masked I/O output data stream. That is, the output data streams from the three MBA L channel interfaces are voted in Voter L. The result is provided on interface L'. This interface is electrically and logically equivalent to the L interface as viewed by the subsequent I/O system (channels, devices, etc.). The R voter corresponds to a second independent I/O interface.

Overall information flow is from three identical output streams to a single output stream. This is, 3 to 1: three L streams to one L' stream. This is then duplicated: three different R streams to one R' stream: again 3 to 1. Thus there are two instances of three identical output streams to a single output stream: the L output stream and the R output stream. For input, there are two instances of 1 to 3 streams: L' and R'.

When an output request is received for the L' channel, and the voter makes a decision to service this request, the request is then propagated from the L' interface through the voter to all three L interfaces. This now triplicated request is in turn separately propagated via the arbitration interface of each of the processor cards. That is, each of the processors forwards its L request along with any other service requests from their R interface and the CPU via its arbitration interface to the associated arbiter. There it participates in the service arbitration vote. There are no bottlenecks in this path. Therefore, all three L requests spawned from the single L' request should arrive at their respective arbiters at essentially the same time. That is, they should arrive at their respective arbiters within a few nanoseconds of each other. They will, however, experience an arbitration delay. When the decision is made to grant service to the L interfaces, that decision is propagated back to the three MBA's and each makes its own memory access to or from its own memory.

When the data from memory is requested, it is accessed from memory and transmitted to the voter, buffered, and compared with the data from the other two elements. The vote is taken and if favorable, that is three out of three agreements or two out of two agreements, a good copy of the data is output from the voter via the L interface. With one disagreement, a failure in the disagreeing processor has been identified. If all three disagree there has been a double failure.

The situation is essentially the same for input except that, at the same time the Voter makes the decision to service a particular requester on channel L' and forwards the request for service, the Voter can signal the interface to begin transmitting data. This data is transmitted to all three L channel interfaces on the respective processors and buffered there. Thus the data transmission can be overlapped with arbitration. When the service request is granted, data is transmitted from the three MBA's to memory simultaneously. Since the flow is from one L' stream to three identical L streams, there is nothing to vote on.

Overall the functional element called a VOTER now can be seen to be a bidirectional data transmission port which functions as a three to one combiner with voting for output transmissions and a one to three splitter without voting for inputs.

DATA SYNCHRONIZATION

Compared to processor synchronization, I/O data synchronization is easy. All data I/O operations are demand/response where the demand is from a single I/O source (not a triplicated source) at a time. That is, the I/O service demand does not have to be synchronized: there is only one request from one L' or R' subchannel at a time. (It will be noted that there can be a request on one L' subchannel at the same time that there is a request on one R' subchannel.) The demand is split one to three and the I/O service request is presented in the same manner as a CPU request. It vies in the same arbitration process as the CPU.

CONTROL SYNCHRONIZATION/VOTING

In the discussion above it was seen that: splitting without voting was performed on data input, and: synchronization AND voting is performed on data output. In this section it will be seen that synchronization/voting must also be performed on outputs and commands that result from I/O instructions.

There is not expected to be any conflict between CPU to I/O service requests. Since all interrupts will be synchronized as will be described later, all elements will output I/O commands in exactly the same sequence. It will still be necessary to both deskew the three processors—again holding back the first request—AND vote on the contents of the control requests. If there is a majority, any dissenting participant should be considered to have failed and be voted out.

INTERRUPTS

There are two generic classes of interrupts: CPU/-precise interrupt such as program checks which are completely synchronous to program execution and asynchronous interrupts such as I/O interrupts that are not normally synchronous to the program execution.

The former presents no problems. Since they are synchronous with program execution they are repeatable on either the same processor or on a different processor. For this reason the sequential operation of all their TMR elements will be exactly the same.

Asynchronous interrupts in general, and I/O interrupts, in particular, are a different matter. Since the I/O system is not triplicated, a single I/O interrupt request must be split and serviced by all three processors in exact sequence with one another. That is, all three CPU's must take an I/O interrupt upon completion of exactly the same CPU instruction.

Since the CPUs are operating in exact sequences albeit skewed with respect to one another, the non-triplicated I/O interrupt request must be split and then either be skewed and presented to the three CPU's at three different absolute times, or delayed and presented at a point of time when the CPU's are in absolute synchronism. The latter is the means of this invention.

The CPU's are guaranteed to be in synchronization with each other within one clock cycle every time a CPU memory access is initiated. (This presumes that every increment of memory delay (wait state) is an exact multiple of the clock period.) Therefore, the interrupt request is delayed within each CPU until that CPU makes a main storage reference at which time the request is made valid. If the interrupt is not masked, the CPU will service it immediately upon completion of the current instruction associated with the memory reference. This will be the same instruction in all three CPUs. If the interrupt is masked, it will be taken at the first opportunity after it is unmasked and this too will be at the end of the same instruction for all three CPU's. (There is a race associated with this operation but because of the delay associated with the memory operation, it is not critical.)

TIMERS AND TOD CLOCKS

The technique described above is a means of implementation and not an architectural change. That is, TMR is employed for fault masking but does not show through to the application programmer. It will, of course, be visible to the operating system and/or other software/microcode required for configuration control; resynchronization following a fault; diagnostics; and other functions not directly visible to the user. Still the implementation as described thus far is architecturally transparent to the user.

There may be one broad area of incompatibility with certain existing architectures. This is timer and clock architecture including Time of Day (TOD) clocks. Here it simply does not appear possible to employ clocks and timers driven from the individual element oscillators in a manner this could be done with a single processor. Since the element oscillators are asynchronous, any CPU reference to timers and clocks will likewise be asynchronous and can lead to inconsistent operation.

The consequence is that either: (a) means be provided to provide exact clock synchronization, or (b) a single external time source be used for all three elements and synchronized in the same manner asynchronous interrupts are synchronized. The latter is consistent with this invention and will be presumed herein: the former will require additional invention and is beyond the scope of this description.

Although there are many different ways to maintain time consistency that are compatible, only one method is described here.

This method is for the CPU to address the clocks and or timers as memory locations. Consistent copies can then be provided in all three elements. This can be done by coordinating updates so that they are synchronized with CPU references. That is, any clock update in memory must be delayed until a CPU/memory reference is required and then awarded the following memory access. Since the CPU's are in synchronism following their memory reference, the subsequent storage update will be consistent for all CPU's if done in this manner. It is obvious that if the clock/timer location(s) have been cached these corresponding entries must be invalidated.

SINGLE CLOCK SYSTEMS

The present invention describes a means of providing TMR operation which incorporates separate unsynchronized clocks on each of the three processing elements and thereby avoids any single-point-of-failure associated with a common clock. The operation of any element is, therefore, inherently asynchronous with respect to that of any other element. This difference is slight but must be compensated for in order to achieve correct operation. This can be accomplished by the means described above.

The same means can also be employed for systems where the elements are operated from a common clock which CANNOT be distributed with less than one cycle skew. Here, given the operation of the individual element is synchronous, the elements will normally operate identically but do so out of phase (skewed) with respect to each other by more than one cycle. That is, they will operate skewed, not in lock step (i.e., have less than one cycle skew). In such an instance the elements must be synchronized. The same means described herein to synchronize asynchronous elements can also be used to synchronize skewed elements.

Clearly, the invention which has been described by way of a preferred embodiment is the basis for much potential growth. The claims which follow are to be construed to protect the invention to include and maintain invention scope which would encompass further improvements and enhancements to the claimed invention as those skilled in the art may develop both now and in the future.

What is claimed is:

1. An asynchronous triple modular redundancy processing system with local arbitration, comprising:
   N processor elements,
   N arbiter elements associated respectively with each of said processor elements,
   a memory uniquely associated with each processor element,
   a bidirectional control bus between each arbiter and its associated processor, and
   a unidirectional control bus between each processor arbiter and the other processors of the system, means for providing each processor with knowledge of which processor of the system is a requestor,
   means for providing to each processor which requester of other elements is competing for service within said system,
   and a plurality of voters for providing service arbitration votes with voting for output transmission and without voting for inputs.

2. The system of claim 1 wherein each processor is provided with means for permitting each processor element to operate on its own clock time.

3. The system of claim 1 where the voters provide service arbitration votes which function as a N to 1 combiner with voting for output transmission and a 1 N splitter without voting for inputs.

4. The system of claim 1 wherein "N" is three.

5. The system of claim 3 wherein "N" is three.

6. An asynchronous redundant processing system with local arbitration comprising:
   N processor elements each having its own clock time and running the same program;
   N global memories each coupled to a respective processor element;
   N arbitrators, each arbitrator coupled to one associated processor element by a bidirectional control bus and each arbitrator connected to the other N−1 processor elements by a unidirectional control bus for receiving signals from said other N−1 processor elements, said arbitrators requiring said processor elements fetch operations from global memories to occur simultaneously to provide synchronism among said processor elements;
   an input output interface; and
   a voter for providing bidirectional data transmission to and from said N processor elements and said input output interface, said voter functioning as an N to one combiner with voting in connection with data streams from said N processor elements for output transmissions to said input output interface, said voter functioning as a one to N splitter without voting for inputs from said input output interface to said N processor elements.

7. The system of claim 6, wherein "N" is three.

* * * * *